United States Patent
Mori et al.

(10) Patent No.: US 9,796,879 B2
(45) Date of Patent: Oct. 24, 2017

(54) FILM-FORMING MATERIAL

(71) Applicant: Tokyo Ohka Kogyo Co., Ltd., Kawasaki-shi (JP)

(72) Inventors: Daijiro Mori, Kawasaki (JP); Akira Kumazawa, Kawasaki (JP); Mai Sugawara, Kawasaki (JP)

(73) Assignee: TOKYO OHKA KOGYO CO., LTD., Kawasaki-shi (JP)

( * ) Notice: Subject to any disclaimer, the term of this patent is extended or adjusted under 35 U.S.C. 154(b) by 181 days.

(21) Appl. No.: 14/450,642

(22) Filed: Aug. 4, 2014

(65) Prior Publication Data

US 2015/0044858 A1 Feb. 12, 2015

(30) Foreign Application Priority Data

Aug. 6, 2013 (JP) .................... 2013-163468
Jun. 27, 2014 (JP) .................... 2014-133375

(51) Int. Cl.
*D06M 15/643* (2006.01)
*C09D 183/08* (2006.01)
*C08G 77/24* (2006.01)
*C08G 77/26* (2006.01)

(52) U.S. Cl.
CPC ........... *C09D 183/08* (2013.01); *C08G 77/24* (2013.01); *C08G 77/26* (2013.01)

(58) Field of Classification Search
CPC ......... C09D 1/00; C09D 183/00; C08G 77/24
See application file for complete search history.

(56) References Cited

U.S. PATENT DOCUMENTS

| | | | |
|---|---|---|---|
| 2009/0087582 A1* | 4/2009 | Watanabe | B81C 1/00031 427/558 |
| 2009/0134119 A1 | 5/2009 | Matsumaru et al. | |
| 2010/0123102 A1* | 5/2010 | Heo | H01B 1/22 252/519.2 |

FOREIGN PATENT DOCUMENTS

| | | | |
|---|---|---|---|
| JP | 2007-086711 | 4/2007 | |
| JP | 2007254678 | * 4/2007 | ............... C09D 1/00 |
| JP | 4970803 B | 4/2012 | |

* cited by examiner

*Primary Examiner* — Alexander Polyansky
(74) *Attorney, Agent, or Firm* — Knobbe Martens Olson & Bear LLP

(57) ABSTRACT

A film-forming material including a metal oxide such as a $SiO_2$ film on the surface of a substrate, in which foreign substances, such as fine particles, are generated with difficulty while being stored, and a method for forming a film, in which the method includes forming a film on the surface of a substrate using the film-forming material. The film-forming material includes a metal compound capable of generating a hydroxyl group upon hydrolysis dissolved in an organic solvent that does not have a functional group that reacts with the metal compound. The organic solvent includes a solvent having a value of Log P of from 0 to 3.5.

10 Claims, No Drawings

FILM-FORMING MATERIAL

CROSS-REFERENCE TO RELATED APPLICATIONS

This application claims priority to Japanese Patent Application No. 2013-163468, filed Aug. 6, 2013; and 2014-133375, filed Jun. 27, 2014, the contents of which are incorporated herein by reference.

BACKGROUND OF THE INVENTION

Field of the Invention

The present invention relates to a film-forming material capable of easily forming a film composed of a metal oxide on the surfaces of various substrates, and a method for forming a film including forming a film on a surface of a substrate using the film-forming material.

Related Art

Conventionally, for various purposes, the formation of a film composed of a metal oxide, such as a $SiO_2$, film is performed on the surface of a substrate used for manufacturing semiconductor elements or various devices. For example, a chemical vapor deposition method (a CVD method) is known as such a method for forming a film composed of a metal oxide.

However, burning at a high temperature of 400° C. or higher is necessary to form a dense film of a metal oxide by a CVD method. For the above high-temperature process, there are problems in that considerable time and cost are involved and production efficiency is poor.

From the above-described problems, a method for forming a dense film of a metal oxide at a low temperature has been proposed. In detail, a method for forming a dense film of a metal oxide on the surface of a substrate by the hydrolysis condensation of a metal compound (W) has been proposed in which the method includes applying a solution prepared by dissolving the metal compound (W) capable of generating a hydroxyl group upon hydrolysis in a specific solvent (S) on the surface of the substrate (see Patent Document 1).

[Patent Document 1] Japanese Unexamined Patent Application, Publication No. 2007-086711

[Patent Document 2] Japanese Patent No. 4970803

SUMMARY OF THE INVENTION

However, there is a problem in that fine particle-type foreign substances are easily generated in the solution including the metal compound (W) used for the method disclosed in Patent Document 1.

Since the surface of the substrate used for manufacturing semiconductor elements or various devices needs to be very clean, the film-forming material on the surface of the substrate requires the generation of foreign substances to be difficult at the time of being stored.

In order to inhibit the generation of foreign substances in the film-forming material on the surface of a substrate, for example, a method has been proposed for producing a film-forming material by removing the material causing generation of foreign substance from the film-forming material by the combination of treatments such as degassing or filtration (Patent Document 2). However, such a method is complicated, and also involves great expense when installing a degassing device or a filtration device, and thereby it has the problem of high cost.

The present invention is achieved in view of the above problems, and the objects thereof are to provide a film-forming material capable of easily forming a film composed of a metal oxide, such as a $SiO_2$ film, on the surface of a substrate, in which the generation of foreign substances, such as fine particles, is difficult at the time of being stored, and a method for forming a film, the method including forming a film on the surface of a substrate using the film-forming material.

The first aspect of the present invention is a film-forming material in which a metal compound (W) capable of generating a hydroxyl group upon hydrolysis is dissolved in an organic solvent (S), the organic solvent (S) does not have a functional group that reacts with the metal compound (W), and also the organic solvent (S) includes a solvent with a value of Log P of from 0 to 3.5.

The second aspect of the present invention is a method for forming a film on the surface of a substrate, the method including treating the surface of the substrate with the film-forming material according to the first aspect before silylation is performed on the surface of the substrate in a process of performing the silylation with a silylating agent on the surface of the substrate.

According to the present invention, a film-forming material in which the film composed of a metal oxide, such as a $SiO_2$ film, can be easily formed on the surface of a substrate, and the generation of foreign substances such as fine particles is difficult at the time of being stored, and a method for forming a film, in which the method includes forming a film on the surface of a substrate using the film-forming material, can be provided.

DETAILED DESCRIPTION OF THE INVENTION

Film-Forming Material

The film-forming material according to the present invention includes a metal compound (W) capable of generating a hydroxyl group upon hydrolysis, in which the metal compound (W) is dissolved in an organic solvent (S). In addition, the organic solvent (S) does not have a functional group that reacts with the metal compound (W). In addition, the organic solvent (S) includes a solvent having a value of Log P of from 0 to 3.5. Hereinafter, essential and optional components included in the film-forming material according to the present invention will be described in order.

[Metal Compound (W)]

A film-forming material essentially includes a metal compound (W) (hereinafter, also referred to as a metal compound) capable of generating a hydroxyl group upon hydrolysis. By applying the film-forming material including such a metal compound (W) on the surface of a substrate, the metal compound (W) on the surface of the substrate is hydrolyzed with the moisture in the atmosphere to generate the metal compound having a hydroxyl group. Subsequently, by generating a dehydration-condensation between the metal compounds having the hydroxyl groups, a thin film of a metal oxide including the same metal as the metal atom included in the metal compound (W) is formed on the surface of the substrate.

The metal atom included in the metal compound (W) is not particularly limited within the range that the purpose of the present invention is not negatively affected. Examples of the metal atom included in the metal compound (W) may include titan, zirconium, aluminum, niobium, silicon, boron, lanthanide, yttrium, barium, cobalt, iron, zirconium, tantalum, and the like. Among these metal atoms, titan and silicon are preferable, and silicon is more preferable.

The number of the metal atoms included in the metal compound (W) may be either one, or two or more although one atom is preferable. In the case where the metal compound (W) includes a plurality of metal atoms, the plurality of metal atoms may be of the same kind or different kinds.

For the metal compound (W), it is preferable that the functional group (hereinafter, also referred to as a hydrolysable group) capable of generating a hydroxyl group upon hydrolysis be directly bound to a metal atom.

The number of the hydrolysable groups included in the metal compound (W) is preferably two or more, more preferably 2 to 4, and still more preferably 4 with respect to one metal atom. In the case where the metal compound (W) includes two or more of the hydrolysable groups, by the condensation reaction between hydroxyl groups generated by hydrolysis, it is easy to form a strong coating film composed of condensates of the metal compounds (W).

Examples of preferred hydrolysable groups may include an alkoxy group, an isocyanate group, a dimethyl amino group, a halogen atom, and the like. Linear or branched aliphatic alkoxy groups having 1 to 5 carbon atoms are preferable as the alkoxy groups. Specific examples of the preferred alkoxy groups may include a methoxy group, an ethoxy group, an n-propoxy group, an isopropoxy group, an n-butoxy group, and the like. A chlorine atom, a fluorine atom, a bromine atom and an iodine atom are preferable as the halogen atoms, but a chlorine atom is more preferable.

Among the hydrolysable groups described above, the isocyanate group is preferable because it is easily hydrolyzed and easily forms a film on the surface of the substrate by the reactions between the metal compounds (W).

For the metal compound (W), along with the hydrolysable group, a hydrogen atom or an organic group may be bound to a metal atom. As an organic group, linear or branched alkyl groups having 1 to 5 carbon atoms are preferable. Specific examples of the alkyl group having 1 to 5 carbon atoms may include a methyl group, an ethyl group, an n-propyl group, an isopropyl group, an n-butyl group, a sec-butyl group, a tert-butyl group, an n-pentyl group, an isopentyl group, a sec-pentyl group, and a tert-pentyl group.

In addition, metal carbonyl, that is a metal complex having carbon monoxide as a ligand, may be also an example of the metal compound (W). Examples of the metal carbonyl may include pentacarbonyl iron (Fe(CO)$_5$) or a polynuclear cluster thereof.

Hereinafter, preferred examples of the metal compound (W) will be described. Preferred examples of the metal compound (W) may be a compound represented by the following General Formula (1).

$$R_{m-n}MX_n \qquad (1)$$

(in the above Formula (1), M represents a metal atom selected from the group consisting of titan, zirconium, aluminum, niobium, silicon, boron, lanthanide, yttrium, barium, cobalt, iron, zirconium, and tantalum, R represents a linear or branched alkyl group having 1 to 5 carbon atoms, X represents a group selected from the group consisting of a linear or branched alkoxy group having 1 to 5 carbon atoms, an isocyanate group, and a halogen atom, m represents the atomic value of the metal atom M, and n represents an integer of 2 or more and m or less.)

In General Formula (1), in the case where X represents a linear or branched alkoxy group having 1 to 5 carbon atoms, specific examples of the metal compound (W) may include a metal alkoxide of rare earth metals such as titanium tetra-n-butoxide, zirconium tetra-n-propoxide, aluminum tri-n-butoxide, niobium penta-n-butoxide, tetramethoxysilane, methyl trimethoxy silane, dimethyl dimethoxy silane, ethyl trimethoxy silane, diethyl dimethoxy silane, methyl triethoxy silane, dimethyl diethoxy silane, ethyl triethoxy silane, diethyl diethoxy silane, and boron triethoxide; and a metal alkoxide of rare earth metals such as lanthanide triisopropoxide and yttrium triisopropoxide.

A hydrolyzed condensate of the metal compound (W) described above having two or more alkoxy groups also can be used as the metal compound (W) as long as the hydrolyzed condensate has one or more alkoxy groups and the film-forming material can be applied onto a substrate.

In General Formula (1), in the case where X represents an isocyanate group, specific examples of the metal compound (W) may include tetraisocyanate silane, titanium tetraisocyanate, zirconium tetraisocyanate, aluminum triisocyanate, and the like.

In General Formula (1), in the case where X represents a halogen atom, X is preferably a chlorine atom, a fluorine atom, a bromine atom, and an iodine atom, and more preferably, a chlorine atom. In General Formula (1), in the case where X represents a halogen atom, specific examples of the metal compound (W) may include tetrachlorotitanium, tetrachlorosilane, methyltrichlorosilane, dimethyldichlorosilane, ethyltrichlorosilane, diethyl dichlorosilane, cobalt chloride (II), and the like.

Among them, a silicon compound represented by the following General Formula (2) is preferable because it has high activity for hydrolysis, especially, and can easily form a film composed of a condensate of the metal compound (W) without performing a heat treatment on the surface of a substrate.

$$R_{4-n}SiX_n \qquad (2)$$

In Formula (2), R represents a linear or branched alkyl group having 1 to 5 carbon atoms, X represents a group selected from the group consisting of an isocyanate group and a halogen atom, and n represents an integer of 2 or more and 4 or less. In General Formula (2), X preferably represents an isocyanate group and n preferably represents 4.

The metal compounds (W) described above may be used singly or in a combination of two or more kinds thereof.

The concentration of the metal compound (W) in the film-forming material is not particularly limited as long as it can prepare the film-forming material, which is uniformly dissolved. The concentration of the metal compound (W) in the film-forming material is typically, preferably 0.01 to 50% by mass, more preferably 0.01 to 10% by mass, still more preferably 0.01 to 5% by mass, and most preferably 0.01 to 1% by mass.

[Organic Solvent (S)]

The organic solvent (S) included in the film-forming material does not have a functional group that reacts with the metal compound (W), and also includes a solvent having a value of Log P of from 0 to 3.5, that is, an octanol/water distribution coefficient. The organic solvent (S) preferably includes a solvent having a value of Log P of from 0 to 2.4. In the case where the organic solvent (S) includes a solvent having a value of Log P of from 0 to 2.4, it is particularly easy to inhibit the generation of fine particles that are condensates of the metal compound (W) in the film-forming material. The organic solvent (S) may be used singly or in a combination of two or more kinds thereof.

The functional group that reacts with the metal compound (W) includes both of a functional group that directly reacts with a group capable of generating a hydroxyl group by hydrolysis and a functional group that reacts with a hydroxyl group generated by hydrolysis. Examples of the functional group that reacts with the metal compound (W) may include a group having a carbon-carbon double bond, such as a vinyl group, a hydroxyl group, a carboxyl group, an amino group, a halogen atom, and the like.

If the organic solvent (S) does not have the functional groups described above, the metal compound (W) can be stably present in the film-forming material. Therefore, in the case of using the film-forming material according to the present invention, a reduction of the content of the metal compound (W) is prevented during the storage of the film-forming material or the generation of fine particles is prevented that are condensates of the metal compound (W) generated as a result of the reaction of the metal compound (W) and the organic solvent (S) in the film-forming material.

For this reason, when a surface of the substrate is treated by using the film-forming material according to the present invention, the surface of the substrate is not contaminated with fine particles, and can be coated with a film composed of a metal-containing compound generated by a hydrolysis condensation of the metal compound (W).

The value of log P of the solvent included in the organic solvent (S) can be calculated by the calculation using the parameters of Ghose, Pritchett, Crippen, et al. (see J. Comp. Chem., 9, 80 (1998)). Such a calculation may be performed by using software such as CAChe 6.1 (manufactured by FUJITSU Ltd.)

Preferred examples of the solvent having a value of log P of from 0 to 3.5 may include hydrocarbon-based solvents such as toluene, xylene, 1,2,4-trimethylbenzene, limonene and pinene; ester-based solvents such as butyl acetate, propylene glycol monomethyl ether acetate, diethylene glycol monobutyl ether acetate, and γ-butyrolactone; ether-based solvents such as diisopentyl ether, dibutyl ether, diethylene glycol dibutyl ether and ethylene glycol dibutyl ether; dimethyl sulfoxide; amide-based solvents such as N-methyl-2-pyrrolidone; and ketone-based solvents such as 2-octanone, acetyl acetone and cyclohexanone.

The content of the solvent having a value of Log P of from 0 to 3.5 in the organic solvent (S) is not particularly limited within the range that the purpose of the present invention is not negatively affected. Typically, the content of the solvent having a value of Log P of from 0 to 3.5 in the organic solvent (S) is preferably 50% by mass or more, more preferably 70% by mass or more, and still more preferably 80% by mass or more.

In addition to the organic solvent (S) having a value of Log P of from 0 to 3.5, examples of the solvent that may be included may include a hydrocarbon-based solvent, such as decane, decene, p-menthane, and p-cymene; dimethyl sulfoxide; and an amide-based solvent such as N-methyl-2-pyrrolidone.

A solvent including one or more hetero atoms selected from N, O, S, and P is preferable as the organic solvent (S). The solvent having such a structure has high polarity in some degree caused by including the above-described hetero atoms. For this reason, the organic solvent (S) including the hetero atoms described above easily inhibits hydrolysis of a metal compound (W) in the film-forming material. It is believed that in the above organic solvents (S), since the water molecules are rapidly distributed in the organic solvents (S) and the water molecules and the molecules of the organic solvent (S) exhibit high affinity, thereby the probability that the molecule of the metal compound (W) comes into contact with the water molecule is decreased, and the hydrolysis speed of the metal compound (W) is delayed.

Among the above-described organic solvents (S), from the viewpoint of the value of Log P and chemical structure, favorable solubility of the metal compound (W), and high surface treatment effect of the substrate by a film formation, ester acetate such as methyl acetate, butyl acetate, ethyl acetate, isopropyl acetate, pentyl acetate, and isopentyl acetate, an ester-based solvent such as propylene glycol monomethyl ether acetate, and γ-butyrolactone, and an ether-based solvent such as diethylene glycol dibutyl ether and ethylene glycol dibutyl ether are preferable, and ester acetate and propylene glycol monomethyl ether acetate are more preferable.

The content of the organic solvent (S) in the film-forming material is generally the residual amount for the total amount of the content of the metal compound (W) and the contents of the other components to be described below.

[Other Components]

The film-forming material may include various additives along with the metal compound (W) within the range that the purpose of the present invention is not negatively affected. Examples of the additives may include a surfactant, a viscosity regulator, an anti-foaming agent, and the like.

The film-forming material is prepared by uniformly mixing and dissolving the above-described metal compound (W), organic solvent (S), and if necessary, other components. By using the film-forming material according to the present invention, a film composed of a metal oxide, such as a $SiO_2$ film, may be easily formed on the surface of a substrate by the hydrolysis condensation of the metal compound (W).

In addition, as a secondary effect caused by using the film-forming material according to the present invention, it may be exemplified that a film of a metal oxide that has abundant hydroxyl groups can be formed without depending on the quality of the materials of the substrate. For example, in some cases, it may be difficult to modify the surfaces of a tungsten substrate, a titan nitride substrate, a silicon nitride substrate, a copper substrate, a gold substrate, and the like, by a silylating agent in the conventional known methods. However, before performing the treatment of the silylating agent, when a film of a metal oxide that has abundant hydroxyl groups is formed on a surface of a substrate by using the film-forming material according to the present invention, the hydroxyl groups exposed on the surface of the film may be favorably reacted with the silylating agent. In that way, even if the substrate is not modified by the silylating agent, the surface of the substrate is favorably modified.

Method for Forming Film

The method for forming a film on the surface of a substrate using the above-described film-forming material is not particularly limited. Hereinafter, the method for forming a film will be described.

The quality of the material of the substrate that is the object to be formed with a film is not particularly limited, and the substrates may be selected from various inorganic substrates and organic substrates. Especially, when the treatment of the surface is performed by a silylating agent after forming the film on the surface of the substrate using the above-described film-forming material, even for a tungsten substrate, a titan nitride substrate, a silicon nitride substrate, a copper substrate, a gold substrate, and the like, in which the surfaces thereof are difficult to modify using conventional known methods, the modification of the surface may be favorably performed.

The method for forming a film on the surface of a substrate using a film-forming material is not particularly limited as long as the film-forming material can be applied onto the surface of the substrate and a hydrolysis reaction of the metal compound (W) can be performed on the surface of the substrate. The hydrolysis of the metal compound (W) may be performed even by moisture in the air, but if necessary, with the purpose of promoting the hydrolysis of the metal compound (W), the film-forming material may be applied onto the surface of the substrate and then water may be sprayed or applied onto the surface of the substrate.

The method for applying a film-forming material onto the surface of a substrate is not particularly limited. In the case of using the metal compound (W) as a solution, the amount of the metal compound (W) applied on the surface of the substrate may be easily adjusted by adjusting the thickness of the coating film to be formed.

As for the treatment of the surface of the substrate by the film-forming material, the film may be formed on the surface of the substrate by hydrolysis condensation of the metal compounds (W), but when the above-described film is formed, it is preferable that the surface of the substrate in a non-treated state be hydrophilized. Whether or not the surface of the substrate is hydrophilized can be confirmed by measuring the degree of hydrophilicity on the surface of the substrate in a known way, for example, the measurement of the contact angle of water before and after the treatment of the surface of the substrate. By confirming the hydrophilization on the surface of the substrate, it can be confirmed that the hydroxyl groups are plentifully introduced to some degree by the formation of a film on the surface of the substrate. When the hydroxyl groups are plentifully introduced onto the surface of the substrate, it is easy to bind the silylating agent on the surface of the film that is formed by the condensation of the metal compounds (W).

In addition, the formation of the film composed of an inorganic oxide on the surface of the substrate can be confirmed by spin-coating the film-forming material in a solution state on the substrate having the desired material quality, for example. In detail, the film is formed by applying the film-forming material on the substrate in the atmosphere, rotating the substrate to uniformly apply the film-forming material on the substrate, and then, spin-drying to blow the solvent. At this time, the moisture in the air and the metal compounds (W) such as $Si(NCO)_4$ are subjected to a hydrolysis reaction, and then, subjected to polycondensation to form a film composed of an inorganic oxide. The thickness of the film composed of an inorganic oxide depends on the concentration of the metal compound (W), the speed of rotation at the time of being spin-applied, humidity, and the like.

Whether or not the film formed by the above method is formed on the substrate and the thickness of the film can be confirmed by an ellipsometer, nano-specification, and the like, for example.

A method for applying a film-forming material on the surface of a substrate is not particularly limited, but the known applying method can be applied. Examples of the preferred applying method may include a spraying method, a spin-coating method, a dip-coating method, a roll-coating method, and the like.

In addition, before the treatment with the film-forming material, a natural oxidation film may be removed from the surface of the substrate when using the substrate having the natural oxidation film on the surface of the substrate such as a tungsten substrate and a copper substrate.

The film to be formed on the surface of a substrate using a film-forming material by the above-described method has various excellent properties such as high etching resistance and high reactivity with a surface treating agent such as a silylating agent.

Silylation

As described above, for the formation of the film on the surface of the substrate using the film-forming material according to the present invention, the surface modification by a silylating agent is preferably performed as a pretreatment of the silylation process to be performed. For the silylation process, the surface of the substrate having the film formed by using the film-forming material including a metal compound (W) is further treated with a silylating agent. Hereinafter, the modification of the surface of the substrate, a silylating agent, and the treatment method of the surface of the substrate with the silylating agent will be described.

[Modification of Surface of Substrate]

The properties of the surface of the substrate to be modified by a silylating agent are not particularly limited, but determined by the type of silylating agent to be used for the treatment.

Specific examples of the modification on the surface of the substrate may include the adjustment of affinity to water on the surface of the substrate, for example, water repellency and hydrophilization, the impartment of electrostatic properties to the surface of the substrate by treatment using a positive charged silylating agent including a quaternary ammonium group and a negative charged silylating agent including a carboxyl group or sulfo group, the impartment of reactivity to various chemicals to the surface of the substrate by treatment using a silylating agent having high-reactive functional groups such as a carboxyl group, an amino group, a hydroxyl group, and a mercapto group, and the like.

Among the modification on the surface of the substrate, water repellency is more preferable. This is because for a substrate having a fine pattern on the surface thereon, when water repellency can be formed on the surface, breaking of the pattern is inhibited.

Recently, there is an increasing tendency that semiconductor devices are highly integrated and have a finer pattern, and thus, the minitaturization and high aspect ratio of the pattern is progressing. However, meanwhile, there is a problem such as a so-called breaking of the pattern. The breaking of the pattern is a phenomenon that when many patterns are formed in parallel on the substrate, the adjacent patterns are so close that they lean against each other, and thus, in some cases, the patterns are broken from the base part. In the case of generating such a breaking of the pattern, since the desired product cannot be obtained, the yield and reliability of the product are decreased.

The "pattern" that is described above includes both of a "resist pattern" to be formed on a substrate by a lithography process (light exposure and developing processes) as a semiconductor manufacturing process and an "inorganic pattern" to be formed by an etching process of the substrate after the lithography process. The modification method on the surface of the substrate according to the present invention is effective for the treatment of the "inorganic pattern" among these patterns.

It is believed that the breaking of the pattern is generated by the surface tension of the rinse liquid when the rinse liquid is dried off in the rinsing treatment by pure water or the like after the pattern is formed. In other words, at the time of removing the rinse liquid in the drying process, the stress between the patterns based on the surface tension of the rinse liquid is affected, and thus, pattern breaking is generated.

Here, the force F that is created between the patterns in the drying process after rinsing is represented by the following Equation (I). In Equation (I), γ represents the surface tension of the rinse liquid, θ represents the contact angle of the rinse liquid, A represents the aspect ratio of the pattern, and D represents the distance between pattern side walls.

$$F = 2\gamma \cdot \cos \theta \cdot A/D \qquad (I)$$

Therefore, when it is possible to impart water repellency on the surface of the pattern, thereby increasing the contact angle of the rinse liquid (when cos θ can be reduced), the force that is created between the patterns in the drying process after rinsing can be reduced, and thus, breaking of the pattern can be prevented.

In addition, as the aspect ratio of the pattern becomes high, the force F that is created between the patterns becomes high, and thus, there is a tendency that the effect of the water repellency on inhibiting the breaking of the pattern is increased.

[Silylating Agent]

The type of silylating agent is not particularly limited as long as it can modify the property of the surface of the substrate to be the desired property, and it is properly selected from the silylating agents that are conventionally used for the modification of various materials, and then, used. Hereinafter, the silylating agent that is used for the water repellency on the surface of the substrate, that is, the preferred modification among the above-described modifications, will be described.

The silylating agent that is used for the water repellency on the surface of the substrate is not particularly limited as long as it can obtain the water repellency effect that is desired on the surface of the substrate, and it may be properly selected from the silylating agents that are conventionally used as a water repellent agent for various materials, and then used. Examples of the preferred silylating agent may include silylating agents represented by the following General Formulas (3) to (10) or a cyclic silazane compound. Hereinafter, the silylating agents represented by General Formulas (3) to (10) and the cyclic silazane compound will be described in order.

(Silylating Agent Represented by General Formula (3))

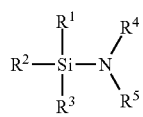

In General Formula (3), $R^1$, $R^2$, and $R^3$ each independently represent a hydrogen atom, a halogen atom, or an organic group. The sum of the carbon atoms of the $R^1$, $R^2$, and $R^3$ is 1 or more. $R^4$ represents a hydrogen atom or a saturated or unsaturated chain hydrocarbon group. $R^5$ represents a hydrogen atom, a saturated or unsaturated chain hydrocarbon group, a saturated or unsaturated non-aromatic cyclic hydrocarbon group, or a non-aromatic heterocyclic group. $R^4$ and $R^5$ may be connected to each other to form non-aromatic heterocycles having a nitrogen atom.

When $R^1$, $R^2$, and $R^3$ are halogen atoms, a chlorine atom, a bromine atom, an iodine atom, and a fluorine atom are preferable.

When $R^1$, $R^2$, and $R^3$ are organic groups, the organic groups may include hetero atoms in addition to a carbon atom. The type of the hetero atom that may be included in the organic group is not particularly limited within the range that the purpose of the present invention is not negatively affected. The hetero atoms that may be included in the organic groups are preferably N, O, and S. When $R^1$, $R^2$, and $R^3$ are organic groups, the sum of the number of the carbon atoms and the number of the hetero atoms which are included in the organic groups is not particularly limited as long as the sum of the carbon number of the $R^1$, $R^2$, and $R^3$ is 1 or more. When $R^1$, $R^2$, and $R^3$ are organic groups, the sum of the number of the carbon atoms and the number of the hetero atoms which are included in the organic groups is preferably 1 to 10, more preferably 1 to 8, and still more preferably 1 to 3. When $R^1$, $R^2$, and $R^3$ are organic groups, a saturated or unsaturated chain hydrocarbon group, an aralkyl group, and an aromatic hydrocarbon group are preferable as the organic groups. Preferred examples of the saturated or unsaturated chain hydrocarbon group may include a methyl group, an ethyl group, a vinyl group, an n-propyl group, an isopropyl group, an allyl group, a 1-propenyl group, an isopropenyl group, an n-butyl group, a sec-butyl group, a tert-butyl group, a 3-butenyl group, an n-pentyl group, an isopentyl group, a sec-pentyl group, a tert-pentyl group, an n-hexyl group, an n-heptyl group, an n-octyl group, an n-nonyl group and an n-decyl group. Among these chain hydrocarbon groups, a methyl group, an ethyl group, a vinyl group, an n-propyl group, and an allyl group are more preferable, and a methyl group, an ethyl group, and a vinyl group are still more preferable. Preferred examples of the aralkyl group may include a benzyl group, a phenyl ethyl group, a phenyl propyl group, an α-naphthyl methyl group and a β-naphthyl methyl group. Preferred examples of the aromatic hydrocarbon group may include a phenyl group, an α-naphthyl group, and a β-naphthyl group.

When $R^4$ is a saturated or unsaturated chain hydrocarbon group, the carbon number of the saturated or unsaturated chain hydrocarbon group is not particularly limited within the range that the purpose of the present invention is not negatively affected. When $R^4$ is a saturated or unsaturated chain hydrocarbon group, the carbon number of the saturated or unsaturated chain hydrocarbon group is preferably 1 to 10, more preferably 1 to 8, and still more preferably 1 to 3. When $R^4$ is a saturated or unsaturated chain hydrocarbon group, preferred examples thereof are the same as a saturated or unsaturated chain hydrocarbon group that is an example of the preferred group for $R^1$, $R^2$, and $R^3$.

When $R^5$ is a saturated or unsaturated chain hydrocarbon group, the saturated or unsaturated chain hydrocarbon group is the same as $R^4$. When $R^5$ is a saturated or unsaturated cyclic hydrocarbon group, the carbon number of the saturated or unsaturated cyclic hydrocarbon group is not particularly limited within the range that the purpose of the present invention is not negatively affected. When $R^5$ is a saturated or unsaturated non-aromatic cyclic hydrocarbon group, the carbon number of the saturated or unsaturated non-aromatic cyclic hydrocarbon group is preferably 3 to 10, more preferably 3 to 6, and still more preferably 5 or 6. When $R^5$ is a saturated or cyclic hydrocarbon group, preferred examples thereof may include a cyclopropyl group, a cyclobutyl group, a cyclopentyl group, a cyclohexyl group, a cyclopentyl group, and a cyclooctyl group. When $R^5$ is a non-aromatic heterocyclic group, the hetero atom included in the non-aromatic heterocyclic group is not particularly limited within the range that the purpose of the present invention in not negatively affected. When $R^5$ is a non-aromatic heterocyclic group, preferred examples of the hetero atom included in the non-aromatic heterocyclic group may include N, O, and S. When $R^5$ is a non-aromatic heterocyclic group, the sum of the number of the hetero atoms and the number of the carbon atoms included in the non-aromatic heterocyclic group is not particularly limited within the range that the purpose of the present invention is negatively affected. When $R^5$ is a non-aromatic heterocyclic group, the sum of the number of the hetero atoms and the number of the carbon atoms included in the non-aromatic heterocyclic group is preferably 3 to 10, more preferably 3 to 6, and still more preferably 5 or 6. When $R^5$ is a non-aromatic heterocyclic group, preferred examples thereof may include a pyrrolidin-1-yl group, a piperidine-1-yl group, a piperazine-1-yl group, a morpholine-1-yl group, and a thiomorpholine-1-yl group.

The number of the atoms included in the non-aromatic heterocyclic group that is formed by binding $R^4$ and $R^5$ to each other is not particularly limited within the range that the purpose of the present invention is not negatively affected. The non-aromatic heterocyclic group that is formed by binding $R^4$ and $R^5$ to each other is preferably a 3-membered ring to a 10-membered ring and more preferably a 5-membered ring or a 6-membered ring. The type of other hetero atom of the carbon atom included in the non-aromatic heterocyclic group that is formed by binding $R^4$ and $R^5$ to each other is not particularly limited within the range that the purpose of the present invention is not negatively affected. A preferred hetero atom included in the non-aromatic heterocyclic group that is formed by binding $R^4$ and $R^5$ to each other may be N, O, and S. Preferred examples of the non-aromatic heterocyclic group that is formed by binding $R^4$ and $R^5$ to each other may include pyrrolidine, piperidine, piperazine, morpholine and thiomorpholine.

Specific examples of a silylating agent represented by General Formula (3) may include N,N-dimethylamino trimethyl silane, N,N-dimethylamino dimethyl silane, N,N-dimethylamino monomethyl silane, N,N-diethylamino trimethyl silane, t-butyl amino trimethyl silane, allyl amino trimethyl silane, trimethylsilyl acetamide, N,N-dimethylamino dimethyl vinyl silane, N,N-dimethylamino dimethyl propyl silane, N,N-dimethylamino dimethyl octyl silane, N,N-dimethylamino dimethyl phenylethyl silane, N,N-dimethylamino dimethyl phenyl silane, N,N-dimethylamino dimethyl-t-butyl silane, N,N-dimethylamino triethyl silane and trimethyl silanamine.

(Silylating Agent Represented by General Formula (4))

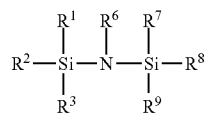

(4)

In General Formula (4), $R^1$, $R^2$, and $R^3$ are the same as the above General Formula (3). $R^6$ represents a hydrogen atom, a methyl group, a trimethyl silyl group, or a dimethyl silyl group. $R^7$, $R^8$, and $R^9$ each independently represent a hydrogen atom or an organic group. The sum of the carbon numbers of $R^7$, $R^8$, and $R^9$ is 1 or more.

When $R^7$, $R^8$, and $R^9$ are organic groups, the organic groups are the same as the case when $R^1$, $R^2$, and $R^3$ are organic groups.

Specific examples of the silylating agent represented by General Formula (4) may include hexamethyldisilazane, N-methyl hexamethyldisilazane, 1,1,3,3-tetramethyl disilazane, 1,3-dimethyl disilazane, 1,3-di-n-octyl-1,1,3,3-tetramethyl disilazane, 1,3-divinyl-1,1,3,3,-tetramethyl disilazane, tris(dimethyl silyl)amine, tris(trimethylsilyl)amine, 1-ethyl-1,1,3,3,3-pentamethyl disilazane, 1-vinyl-1,1,3,3,3-pentamethyl disilazane, 1-propyl-1,1,3,3,3-pentamethyl disilazane, 1-phenylethyl-1,1,3,3,3-pentamethyl disilazane, 1-tert-butyl-1,1,3,3,3-pentamethyl disilazane, 1-phenyl-1,1,3,3,3-pentamethyl disilazane and 1,1,1-trimethyl-3,3,3-triethyl disilazane.

(Silylating Agent Represented by General Formula (5))

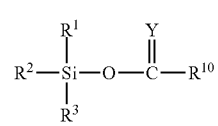

(5)

In General Formula (5), $R^1$, $R^2$, and $R^3$ are the same as the above General Formula (3). Y represents O, $CHR^{11}$, $CHOR^{11}$, $CR^{11}R^{11}$, or $NR^{12}$. $R^{10}$ and $R^{11}$ each independently represent a hydrogen atom, a saturated or unsaturated chain hydrocarbon group, a saturated or unsaturated non-aromatic cyclic hydrocarbon group, a trialkyl silyl group, a trialkyl siloxy group, an alkoxy group, a phenyl group, a phenyl ethyl group, or an acetyl group. $R^{12}$ represents a hydrogen atom, an alkyl group, or a trialkyl silyl group.

When $R^{10}$ and $R^{11}$ are a saturated or unsaturated chain hydrocarbon group or a saturated or unsaturated non-aromatic cyclic hydrocarbon group, the saturated or unsaturated chain hydrocarbon group or saturated or unsaturated non-aromatic cyclic hydrocarbon group is the same as the case when $R^5$ is a saturated or unsaturated chain hydrocarbon group or a saturated or unsaturated non-aromatic cyclic hydrocarbon group in General Formula (3).

When $R^{10}$ and $R^{11}$ are a trialkyl silyl group, a trialkyl siloxy or an alkoxy group, the carbon number of the alkyl group included therein is not particularly limited within the range that the purpose of the present invention is not negatively affected. The carbon number of the alkyl group included therein is preferably 1 to 10, more preferably 1 to 8, and still more preferably 1 to 3. Preferred examples of the alkyl group included therein may include a methyl group, an ethyl group, an n-propyl group, an isopropyl group, an n-butyl group, a sec-butyl group, a tert-butyl group, an n-pentyl group, an isopentyl group, a sec-pentyl group, a tert-pentyl group, an n-hexyl group, an n-heptyl group, an n-octyl group, an n-nonyl group and an n-decyl group. Among these alkyl groups, a methyl group, an ethyl group, and an n-propyl group are more preferable, and a methyl group and an ethyl group are still more preferable.

When $R^{12}$ is an alkyl group or a trialkyl silyl group, the carbon number of the alkyl groups included in an alkyl group or a trialkyl silyl group is not particularly limited within the range that the purpose of the present invention is not negatively affected. The carbon number of the alkyl group included in an alkyl group or a trialkyl silyl group is preferably 1 to 10, more preferably 1 to 8, and still more preferably 1 to 3. Preferred examples of the alkyl group included in an alkyl group or a trialkyl silyl group may include a methyl group, an ethyl group, an n-propyl group, an isopropyl group, an n-butyl group, a sec-butyl group, a tert-butyl group, an n-pentyl group, an isopentyl group, a sec-pentyl group, a tert-pentyl group, an n-hexyl group, an n-heptyl group, an n-octyl group, an n-nonyl group and an n-decyl group. Among these alkyl groups, a methyl group, an ethyl group, and an n-propyl group are more preferable, and a methyl group and an ethyl group are still more preferable.

Specific examples of the silylating agent represented by General Formula (5) may include trimethylsilyl acetate, dimethylsilyl acetate, monomethylsilyl acetate, trimethylsilyl propionate, trimethylsilyl butylate and trimethylsilyl-2-butenoate.

(Silylating Agent Represented by General Formula (6))

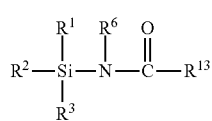
(6)

In General Formula (6), $R^1$, $R^2$, and $R^3$ are the same as the above General Formula (3). $R^6$ is the same as the above General Formula (4). $R^{13}$ represents a hydrogen atom, a saturated or unsaturated chain hydrocarbon group, a trifluoromethyl group, or a trialkylsilyl amino group.

When $R^{13}$ is a saturated or unsaturated chain hydrocarbon group, the saturated or unsaturated chain hydrocarbon group is the same as the case when $R^4$ is a saturated or unsaturated chain hydrocarbon group in General Formula (3).

When $R^{13}$ is a trialkylsilyl amino group, the alkyl group included in the trialkylsilyl amino group is the same as the alkyl group included therein in the case when $R^{10}$ and $R^{11}$ represent a trialkyl silyl group, a trialkyl siloxy group, or an alkoxy group in General Formula (5).

Specific examples of the silylating agent represented by General Formula (6) may include N,N'-bis(trimethylsilyl) urea, N-trimethylsilyl acetamide, N-methyl-N-trimethylsilyl trifluoro acetamide and N,N-bis(trimethylsilyl)trifluoro acetamide.

(Silylating Agent Represented by General Formula (7))

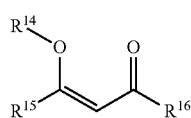
(7)

In General Formula (7), $R^{14}$ represents a trialkyl silyl group. $R^{15}$ and $R^{16}$ each independently represent a hydrogen atom or an organic group.

When $R^{14}$ is a trialkyl silyl group, the alkyl group included in the trialkyl silyl group is the same as the alkyl group included therein in the case when $R^{10}$ and $R^{11}$ are a trialkyl silyl group, a trialkyl siloxy group, or an alkoxy group in General Formula (5).

When $R^{15}$ and $R^{16}$ are an organic group, the organic group is the same as the organic group in the case when $R^1$, $R^2$, and $R^3$ are an organic group in General Formula (3).

Specific examples of the silylating agent represented by General Formula (7) may include 2-trimethylsiloxypentane-2-ene-4-one.

(Silylating Agent Represented by General Formula (8))

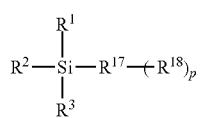
(8)

In General Formula (8), $R^1$, $R^2$, and $R^3$ are the same as the above General Formula (3). $R^{17}$ represents a saturated or unsaturated chain hydrocarbon group, a saturated or unsaturated non-aromatic cyclic hydrocarbon group, or a non-aromatic heterocyclic group. $R^{18}$ represents $—SiR^1R^2R^3$. p represents 0 or 1.

When p is 0, the saturated or unsaturated chain hydrocarbon group, saturated or unsaturated non-aromatic cyclic hydrocarbon group, or non-aromatic heterocyclic group as $R^{17}$ is the same as $R^5$ in General Formula (3). When p is 1, the organic group as $R^{17}$ is a divalent group in which one hydrogen atom is excluded from the organic group in the case when $R^1$, $R^2$, and $R^3$ are an organic group in General Formula (3).

Specific examples of the silylating agent represented by General Formula (8) may include 1,2-bis(dimethyl chlorosilyl)ethane and t-butyldimethyl chlorosilane.

(Silylating Agent Represented by General Formula (9))

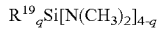
$R^{19}{}_q Si[N(CH_3)_2]_{4-q}$ (9)

In General Formula (9), $R^{19}$ each independently represents a chain hydrocarbon group having 1 to 18 carbon atoms in which some or all of the hydrogen atoms may be substituted with a fluorine atom. q represents 1 or 2.

In General Formula (9), the number of carbon atoms of $R^{19}$ is preferably 2 to 18 and more preferably 8 to 18.

In the case of a saturated chain hydrocarbon group, in which $R^{19}$ is not substituted with a fluorine atom, examples thereof may include a methyl group, an ethyl group, an n-propyl group, an isopropyl group, a butyl group, a sec-butyl group, a tert-butyl group, an isobutyl group, an amyl group, an isoamyl group, a tert-amyl group, a hexyl group, a 2-hexyl group, a 3-hexyl group, a heptyl group, a 2-heptyl group, a 3-heptyl group, an isoheptyl group, a tert-heptyl group, an n-octyl group, an isooctyl group, a tert-octyl group, a 2-ethyl hexyl group, a nonyl group, an isononyl group, a decyl group, a dodecyl group, an tridecyl group, a tetradecyl group, a pentadecyl group, a hexadecyl group, a heptadecyl group and an octadecyl group.

In the case of an unsaturated chain hydrocarbon group in which $R^{19}$ is not substituted with a fluorine atom, examples thereof may include a vinyl group, a 1-propenyl group, an allyl group, an isopropenyl group, a 1-butenyl group, a 2-butenyl group, a 3-butenyl group, a 1,3-butadienyl group, a 1-ethyl vinyl group, a 1-methyl-1-propenyl group, a 1-methyl-2-propenyl group, a 4-pentenyl group, a 1,3-pentadienyl group, a 2,4-pentadienyl group, a 3-methyl-1-butenyl group, a 5-hexenyl group, a 2,4-hexadienyl group, a 6-heptenyl group, a 7-octenyl group, an 8-nonenyl group, a 9-decenyl group, a 10-undecenyl group, a 11-dodecenyl group, a 12-tridecenyl group, a 13-tetradecenyl group, a 14-pentadecenyl group, a 15-hexadecenyl group, a 16-heptadecenyl group, a 17-octadecenyl group, an ethynyl group, a propargyl group, a 1-propynyl group, a 1-butynyl group, a 2-butynyl group, a 3-butynyl group, a 1-pentynyl group, a 2-pentynyl group, a 3-pentynyl group, a 4-pentynyl group, a 1-hexynyl group, a 2-hexynyl group, a 3-hexynyl group, a 4-hexynyl group, a 5-hexynyl group, a 6-heptynyl group, a 7-octynyl group, a 8-nonynyl group, a 9-decynyl group, a 10-undecynyl group, a 11-dodecynyl group, a 12-tridecynyl group, a 13-tetradecynyl group, a 14-pentadecynyl group, a 15-hexadecynyl group, a 16-heptadecynyl group and a 17-octadecynyl group.

In the case of a chain hydrocarbon group in which $R^{19}$ is substituted with a fluorine atom, the number and site of the substitution of the fluorine atom are not particularly limited. The number of the substitution of the fluorine atom in the chain hydrocarbon group is preferably 50% or more, more preferably 70% or more, and still more preferably 80% or more of the number of the hydrogen atoms included in the chain hydrocarbon group.

$R^{19}$ is preferably a linear chain hydrocarbon group having 1 to 18 carbon atoms in which some or all of the hydrogen atoms may be substituted with a fluorine atom, because excellent water repellency can be easily obtained. In addition, $R^{19}$ is preferably a saturated linear chain hydrocarbon group having 1 to 18 carbon atoms (an alkyl group having 1 to 18 carbon atoms), in which some or all of the hydrogen atoms may be substituted with a fluorine atom, from the viewpoint of the storage stability of the silylating agent.

In General Formula (9), q is 1 or 2, and preferably 1.

(Silylating Agent Represented by General Formula (10))

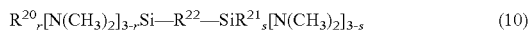

$$R^{20}{}_r[N(CH_3)_2]_{3-r}Si-R^{22}-SiR^{21}{}_s[N(CH_3)_2]_{3-s} \quad (10)$$

In General Formula (10), $R^{20}$ and $R^{21}$ each independently represent a hydrogen atom, or a linear chain or branched alkyl group having 1 to 4 carbon atoms. $R^{22}$ represents a linear chain or branched alkylene group having 1 to 16 carbon atoms.

r and s each independently represent an integer of from 0 to 2.

$R^{20}$ and $R^{21}$ may be the same as or different to each other. $R^{20}$ and $R^{21}$ are preferably a hydrogen atom or a linear chain or branched alkyl group having 1 to 3 carbon atoms, more preferably a hydrogen atom or a methyl group, and still more preferably a methyl group.

When $R^{20}$ and $R^{21}$ are a linear chain or branched alkyl group having 1 to 4 carbon atoms, specific examples thereof may include a methyl group, an ethyl group, an n-propyl group, an isopropyl group, an n-butyl group, a sec-butyl group, a tert-butyl group and an isobutyl group.

The compound represented by General Formula (10) includes a linear chain or branched alkylene group having 1 to 16 carbon atoms as $R^{22}$. The linear chain or branched alkylene group that is $R^{22}$ has preferably 1 to 10 carbon atoms, and more preferably 2 to 8 carbon atoms. In addition, the linear chain alkylene group is a methylene group or an α,ω-linear chain alkylene group, and the branched alkylene group is a methylene group and an alkylene group other than an α,ω-linear chain alkylene group. $R^{22}$ is preferably the linear chain alkylene group.

When $R^{22}$ is a linear chain or branched alkylene group having 1 to 16 carbon atoms, examples thereof may include a methylene group, a 1,2-ethylene group, a 1,1-ethylene group, a propane-1,3-diyl group, a propane-1,2-diyl group, a propane-1,1-diyl group, a propane-2,2-diyl group, a butane-1,4-diyl group, a butane-1,3-diyl group, a butane-1,2-diyl group, a butane-1,1-diyl group, a butane-2,2-diyl group, a butane-2,3-diyl group, a pentane-1,5-diyl group, a pentane-1,4-diyl group, a hexane-1,6-diyl group, a heptane-1,7-diyl group, an octane-1,8-diyl group, a 2-ethyl hexane-1,6-diyl group, a nonane-1,9-diyl group, a decane-1,10-diyl group, an undecane-1,11-diyl group, a dodecane-1,12-diyl group, a tridecane-1,13-diyl group, a tetradecane-1,14-diyl group, a pentadecane-1,15-diyl group and a hexadecane-1,16-diyl group.

In the compound represented by General Formula (10), s and r each independently are an integer of from 0 to 2. Since the synthesis and obtaining of the compound represented by Formula (10) are easy, s and r are preferably 1 or 2, and more preferably 2.

(Cyclic Silazane Compound)

As a silylating agent, a cyclic silazane compound is also preferable. Hereinafter, the cyclic silazane compound will be described.

Examples of the cyclic silazane compound may include cyclic disilazane compounds such as 2,2,5,5-tetramethyl-2,5-disila-1-azacyclopentane and 2,2,6,6-tetramethyl-2,6-disila-1-azacyclohexane; cyclic trisilazane compounds such as 2,2,4,4,6,6-hexamethylcyclotrisilazane and 2,4,6-trimethyl-2,4,6-trivinylcyclotrisilazane; cyclic tetrasilazane compounds such as 2,2,4,4,6,6,8,8-octamethylcyclotetrasilazane; and the like.

Among them, the cyclic disilazane compounds are preferable, and 2,2,5,5-tetramethyl-2,5-disila-1-azacyclopentane and 2,2,6,6-tetramethyl-2,6-disila-1-azacyclohexane are more preferable. As the cyclic disilazane compounds, there is a 5-membered ring structure such as 2,2,5,5-tetramethyl-2,5-disila-1-azacyclopentane and a 6-membered ring structure such as 2,2,6,6-tetramethyl-2,6-disila-1-azacyclohexane, but the 5-membered ring structure is more preferable.

[Treatment Method]

A conventionally known method can be used without any specific limitation as a method for treating the surface of a substrate with a silylating agent. For example, there may be a method for contacting the surface of a substrate with the vapor prepared by evaporating a silylating agent, and a method for contacting the surface of a substrate with a surface treating agent including a silylating agent by a spraying method, a spin-coating method, a dip-coating method, a roll-coating method, and the like.

Among these methods, the method for contacting the surface of a substrate with a surface treating agent including a silylating agent is preferable because it is easy to treat the surface of the substrate uniformly. The surface treating agent including a silylating agent preferably includes an organic solvent along with the silylating agent.

The organic solvent capable of being included in a surface treating agent including a silylating agent may be sulfoxides such as dimethyl sulfoxide; sulfones such as dimethyl sulfone, diethyl sulfone, bis(2-hydroxyethyl)sulfone, and tetramethylene sulfone; amides such as N,N-dimethylformamide, N-methyl formamide, N,N-dimethyl acetamide, N-methyl acetamide, and N,N-diethyl acetamide; lactams such as N-methyl-2-pyrrolidone, N-ethyl-2-pyrrolidone, N-propyl-2-pyrrolidone, N-hydroxymethyl-2-pyrrolidone, and N-hydroxyethyl-2-pyrrolidone; imidazolidinones such as 1,3-dimethyl-2-imidazolidinone, 1,3-diethyl-2-imidazolidinone, and 1,3-diisopropyl-2-imidazolidinone; (poly)alkylene glycol dialkyl ethers such as ethylene glycol dimethyl ether, ethylene glycol diethyl ether, diethylene glycol dimethyl ether, diethylene glycol methyl ethyl ether, diethylene glycol diethyl ether, and triethylene glycol dimethyl ether; (poly)alkylene glycol alkyl ester acetates such as ethylene glycol monomethyl ether acetate, ethylene glycol monoethyl ether acetate, diethylene glycol monomethyl ether acetate, diethylene glycol monoethyl ether acetate, propylene glycol monomethyl ether acetate, and propylene glycol monoethyl ether acetate; other ethers such as tetrahydrofuran; ketones such as methyl ethyl ketone, cyclohexanone, 2-heptanone, and 3-heptanone; alkyl ester lactates such as 2-hydroxy methyl propionate, and 2-hydroxy ethyl propionate; other esters such as 3-methoxy methyl propionate, 3-methoxy ethyl propionate, 3-ethoxy methyl propionate, 3-ethoxy ethyl propionate, ethoxyethyl acetate, 3-methyl-3-methoxybutyl acetate, 3-methyl-3-methoxybutyl propionate, ethyl acetate, n-propyl acetate, i-propyl acetate, n-butyl acetate, i-butyl acetate, n-pentyl acetate, i-pentyl acetate, n-butyl propionate, ethyl butyrate, n-propyl butyrate, i-propyl butyrate, n-butyl butyrate, methyl pyruvate, ethyl pyruvate, n-propyl pyruvate, methyl acetoacetate, ethyl acetoacetate, and 2-ethyl oxobutanoate; lactones such as β-propiolactone, γ-butyrolactone, and δ-pentirolactone; linear chain, branched, or cyclic hydrocarbons such as n-hexane, n-heptane, n-octane, n-nonane, methyl octane, n-decane, n-undecane, n-dodecane, 2,2,4,6,6-pentamethyl heptane, 2,2,4,4,6,8,8-heptamethyl nonane, cyclohexane, and methyl cyclohexane; aromatic hydrocarbons such as benzene, toluene, naphthalene, and 1,3,5-trimethyl benzene; terpenes such as p-menthane, diphenyl menthane, limonene, terpinene, bornane, norbornane, and pinane; and the like. The organic solvents may be used singly or in a combination of two or more kinds thereof.

After the surface of the substrate is treated with a silylating agent, if necessary, it is preferable to remove the water or organic solvent that remained on the surface of the substrate. A method of removing the water or organic solvent is not particularly limited, and for example, there may be a method of spraying nitrogen or dried air onto the surface of the substrate or a method of heating the substrate at a proper temperature according to the boiling point of the solvent to be removed.

EXAMPLES

Hereinafter, the present invention will be described in more detail with reference to Examples, but the present invention is not limited to Examples.

Reference Example 1

The contact angle of the surface of a non-treated tungsten substrate was measured by using Dropmaster 700 (manufactured by Kyowa Interface Science Co., Ltd.). Specifically, a pure water droplet (1.8 μL) was dropped onto the surface of the substrate, and then after 10 seconds, the contact angle was measured. As a result, the contact angle of the water on the surface of the non-treated tungsten substrate was 33°.

Reference Example 2

After the surface of the tungsten substrate was brought into contact with an aqueous choline solution including a concentration of 0.1% by mass of choline for 120 seconds, the surface of the substrate was washed with ion-exchange distilled water for 60 seconds to remove the natural oxidation film from the surface of the tungsten substrate. Sequentially, nitrogen was blown over the surface of the substrate to dry the surface of the substrate.

The contact angle of the surface of the tungsten substrate without the natural oxidation film that was obtained according to the above method was measured in the same method as Reference Example 1. As a result, the contact angle of the water on the substrate of the tungsten substrate without the natural oxidation film was 6.8°.

Examples 1 to 9 and Comparative Examples 1 to 8

In Examples 1 to 9 and Comparative Examples 1 to 8, the solvents listed in Table 1 were used as the organic solvents (S) in the film-forming material. The reactive functional group in Table 1 is a functional group having reactivity with the metal compounds (W) listed in Table 1.

(Preparation of Film-Forming Material)

Tetraisocyanate silane ($Si(NCO)_4$) was dissolved in each of the solvents listed in Table 2 in the concentrations listed in Table 2 to prepare a film-forming material including tetraisocyanate silane.

(Formation of Film)

The natural oxidation film was removed from the surface of the tungsten substrate in the same method as Reference Example 1. Sequentially, the substrate without the natural oxidation film was immersed in isopropanol for 60 seconds. Following this, the substrate was immersed in the film-forming material. By bringing the film-forming material into contact with the surface of the substrate for 60 seconds, the hydrolysate of tetraisocyanate silane was condensed at the surface of the substrate to form a film on the surface of the substrate.

(Silylation)

Sequentially, the substrate treated with the film-forming material was immersed in the propylene glycol monomethyl ether acetate solution having a concentration of 10% by mass of N-(trimethylsilyl)dimethyl amine and then the substrate was left for 60 seconds to perform the treatment with a silylating agent. The organic solvent remained on the surface of the substrate treated with a silylating agent was substituted with isopropanol, and then the substrate was washed with ion-exchange distilled water for 60 seconds. After washing, nitrogen was blown over the surface of the substrate to dry the surface of the substrate.

The contact angle of the water on the surface of the substrate after being treated with a silylation agent was measured using the same method as Reference Example 1 by using Dropmaster 700 (manufactured by Kyowa Interface Science Co., Ltd.). After treating the surface of the substrate using the film-forming materials according to all of Examples and Comparative Examples, the contact angle of the water on the surface of the substrate that is further silylated is listed in Table 2.

(Confirmation of Generation of Fine Particles)

In the cases when the film-forming materials according to all of Examples and Comparative Examples were stored at room temperature according to the following method, the generation of fine particles in the film-forming materials was evaluated.

First, the film-forming material was filtered in a nitrogen atmosphere to remove fine particles having a particle diameter of 0.15 μm or more from the film-forming material. Sequentially, the film-forming material without the fine particles was stored at room temperature in a nitrogen atmosphere for 3 days. After storing the film-forming material for 3 days at room temperature, the amount of the fine particles having a particle diameter of 0.15 μm or more in the film-forming material was measured by using a particle sensor in liquid (KS-42AF manufactured by RION Co., Ltd.). From the measured results, whether or not fine particles were easily generated in the film-forming material was evaluated based on the following standards. The evaluated results are listed in Table 2.

Good: After storing it at room temperature for 3 days, the amount of fine particles having a particle diameter of 0.15 μm or more was less than 100 particles/ml in the film-forming material.

Bad: After storing it at room temperature for 3 days, the amount of fine particles having a particle diameter of 0.15 μm or more was 100 particles/ml or more in the film-forming material.

Reference Example 3

The surface of the tungsten substrate was treated by using N-(trimethylsilyl)dimethylamine as a silylating agent in the same method as Example 1, except that the substrate was not brought into contact with the film-forming material for 60 seconds. The contact angle of the water on the surface of the tungsten substrate treated with a silylating agent was measured in the same method as Reference Example 1. The contact angle of the water on the surface of the tungsten substrate that was silylated and was not treated with the film-forming material was 6.5°.

TABLE 1

| Type of solvent | Reactive group | Value of Log P |
| --- | --- | --- |
| Propylene glycol monomethyl ether acetate (PG-MEA) | — | 0.112 |
| Butyl acetate | — | 1.071 |
| γ-Butyrolactone | — | 0.006 |
| Diethylene glycol dibutyl ether | — | 2.098 |
| Ethylene glycol dibutyl ether | — | 2.263 |
| Decane | — | 4.467 |
| p-Menthane | — | 3.766 |
| Dimethyl sulfoxide | — | −0.681 |
| N-Methyl formamide | —NH— | −0.501 |
| N-Methyl-2-pyrrolidone | — | −0.394 |
| Butyl diglycol | —OH | 0.612 |
| Propylene glycol monomethyl ether | —OH | −0.017 |
| n-Octanol | —OH | 2.527 |

TABLE 2

| | Concentration of $Si(NCO)_4$ (% by mass) | Type of solvent in the film-forming material | Contact angle of the water (°) | Generation of fine particles |
| --- | --- | --- | --- | --- |
| Reference example 1 | — | Non-treated | 33 | — |
| Reference example 2 | — | Removal of oxidation film | 6.8 | — |
| Reference example 3 | — | Not treated with film-forming material | 6.5 | — |
| Example 1 | 0.2 | Propylene glycol monomethyl ether acetate (PGMEA) | 111.5 | Good |
| Example 2 | 0.2 | Butyl acetate | 116.7 | Good |
| Example 3 | 0.2 | γ-Butyrolactone | 99.5 | Good |
| Example 4 | 0.2 | Diethylene glycol dibutyl ether | 79.2 | Good |
| Example 5 | 0.2 | Ethylene glycol dibutyl ether | 101.8 | Good |
| Example 6 | 0.2 | Solvent mixture of PSMEA and decane (mass ratio: PGMEA/Decane = 4/1) | 110.1 | Good |
| Example 7 | 0.2 | Solvent mixture of PSMEA and decane (mass ratio: PGMEA/Decane = 9/1) | 109.3 | Good |
| Example 8 | 0.2 | Solvent mixture of PSMEA and decane (mass ratio: PGMEA/Decane = 5/5) | 109.8 | Good |
| Example 9 | 0.7 | Butyl acetate | 115.1 | Good |
| Comparative example 1 | 0.04 | Decane | 110.3 | Bad |
| Comparative example 2 | 0.2 | p-Menthane | 115.8 | Bad |
| Comparative example 3 | 0.2 | Dimethyl sulfoxide | 9.9 | Good |
| Comparative example 4 | 0.2 | N-Methyl formamide | 6.8 | Good |
| Comparative example 5 | 0.2 | N-Methyl-2-pyrrolidone | 8.4 | Good |
| Conparative example 6 | 0.2 | Butyl diglycol | 5.2 | Good |
| Conparative example 7 | 0.2 | Propylene glycol monomethyl ether | 5.5 | Good |
| Comparative example 8 | 0.2 | n-Octanol | 5.4 | Good | group upon hydrolysis is dissolved in an organic solvent (S), the organic solvent (S) includes a solvent having a value of Log P of from 0 to 3.5, a film is formed on the surface of a substrate by using a film-forming material which does not have a functional group capable of reacting with the metal compound (W), and then the surface of the substrate is treated with a silylating agent, so that even if it is difficult to directly perform the silylation like a tungsten substrate, a favorable surface modification (water repellency) effect can be obtained by the silylation.

Meanwhile, for Reference Example 3, in which the surface of a substrate was not treated with a film-forming material, but was treated with a silylating agent, a surface modification effect caused by the silylation was not recognized.

According to the comparison between Examples 1 to 9 and Reference Example 3, it can be confirmed that the reactivity with a silylating agent on the surfaces of the substrates treated with the film-forming materials according to Examples 1 to 9 are absolutely different from the reactivity with a silylating agent on the surface of the substrate that is not treated with the film-forming material. From the above fact it can be confirmed that by treating the surface of the substrate using the film-forming materials according to Examples 1 to 9, the film of inorganic oxide ($SiO_2$) having plentiful hydroxyl groups is formed on the surface of the substrate.

According to Examples 1 to 9, it can be confirmed that a metal compound (W) capable of generating a hydroxyl According to Examples 1 to 9, it can be confirmed that fine particles are generated with difficulty in the film-forming materials while being stored, in which a metal compound (W) capable of generating a hydroxyl group upon hydrolysis is dissolved in organic solvent (S), the organic solvent (S) includes a solvent having a value of Log P of from 0 to 3.5, and the organic solvent (S) does not have a functional group capable of reacting with the metal compound (W).

According to Comparative Examples 1 and 2, it can be confirmed that when the film-forming material only includes a solvent having a value of Log P of more than 3.5, but does not include a solvent having a value of Log P of from 0 to 3.5 as an organic solvent (S), fine particles are easily generated in the film-forming material while storing the film-forming material.

According to Comparative Examples 3 to 8, it can be confirmed that when the film-forming material only includes a solvent having a value of Log P of less than 0, but does not include a solvent having a value of Log P of from 0 to 3.5 as an organic solvent (S), or includes a solvent having a functional group capable of reacting with a metal compound (W) capable of generating a hydroxyl group upon hydrolysis, even if the surface of a substrate is treated with the film-forming material, and then is subjected to a silylation, it is difficult to obtain a surface modification effect by the silylation. In other words, it can be confirmed that when the surface of a substrate is treated with the film-forming materials according to Comparative Examples 3 to 8, a film of an inorganic oxide ($SiO_2$) having plentiful hydroxyl groups is not formed on the surface of the substrate.

What is claimed is:

1. A film-forming material comprising:
   a metal compound (W) and an organic solvent (S), wherein the metal compound (W) is capable of generating a hydroxyl group, and
   the organic solvent (S) does not have a functional group that reacts with the metal compound (W), and the organic solvent (S) comprises a solvent having a value of Log P of from 0 to 3.5, and the organic solvent (S) comprises one or more heteroatoms selected from the group consisting of N, O, S, and P.

2. The film-forming material according to claim 1, wherein the metal compound (W) is a silicon compound having two or more groups that are selected from the group consisting of an isocyanate group and a halogen atom, and are bound to a silicon atom.

3. The film-forming material according to claim 1, wherein the concentration of the metal compound (W) is from 0.1 to 10% by mass in the film-forming material.

4. The film-forming material according to claim 1, wherein the concentration of the metal compound (W) is from 0.1 to 5% by mass in the film-forming material.

5. The film-forming material according to claim 1, wherein the concentration of the metal compound (W) is from 0.1 to 1% by mass in the film-forming material.

6. The film-forming material according to claim 1, wherein the organic solvent (S) includes a solvent having a value of Log P of from 0 to 2.4.

7. The film-forming material according to claim 1, wherein the solvent having a value of Log P of from 0 to 3.5 is one or more selected from the group consisting of methyl acetate, butyl acetate, ethyl acetate, isopropyl acetate, pentyl acetate, isopentyl acetate, propylene glycol monomethyl ether acetate, γ-butyrolactone, diethylene glycol dibutyl ether and ethylene glycol dibutyl ether.

8. A film-forming material comprising:
   a metal compound (W) and an organic solvent (S), wherein the metal compound (W) is capable of generating a hydroxyl group, and
   the organic solvent (S) does not have a functional group that reacts with the metal compound (W), and the organic solvent (S) comprises a solvent having a value of Log P of from 0 to 1.071.

9. The film-forming material according to claim 1, wherein the solvent having a value of Log P of from 0 to 3.5 is one or more selected from the group consisting of methyl acetate, butyl acetate, isopropyl acetate, pentyl acetate, isopentyl acetate, propylene glycol monomethyl ether acetate, γ-butyrolactone, diethylene glycol dibutyl ether and ethylene glycol dibutyl ether.

10. The film-forming material according to claim 1, wherein the concentration of the metal compound (W) is from 0.1 to 0.2% by mass in the film-forming material.

* * * * *